UNITED STATES PATENT OFFICE.

PAUL H. A. LEDER, OF BALTIMORE, MARYLAND, ASSIGNOR OF ONE-FOURTH TO ALEXANDER M. HANLINE AND ONE-FOURTH TO ERNEST E. QUANDT, OF BALTIMORE, MARYLAND.

CELLULOSE OR PYROXYLIN COMPOUND.

974,285.  Specification of Letters Patent.  Patented Nov. 1, 1910.

No Drawing. Application filed June 22, 1909. Serial No. 503,678.

*To all whom it may concern:*

Be it known that I, PAUL H. A. LEDER, a subject of the German Emperor, residing at Baltimore, in the State of Maryland, have invented certain new and useful Improvements in Cellulose or Pyroxylin Compounds; and I do hereby declare the following to be a full, clear, and exact description of the invention, such as will enable others skilled in the art to which it appertains to make and use the same.

My invention relates to the manufacture of a cellulose or pyroxylin compound capable of use for many purposes as a substitute for rubber, and which, comparatively, costs much less, besides having properties of its own that render it valuable and efficient for various uses.

In order to produce my new article I make a solution of cellulose or of celluloid in any well known solvent thereof, for example, a mixture of alcohol and ether, and acetone are types, and I add to this solution of the cellulose or celluloid in acetone, or in ether-alcohol mixture, a small percentage of a solution of sulfur dissolved in chloroform, stir well, and allow to dry, or first work it up into the articles to be made therefrom and then allow it to dry. The drying is preferably done in closed chambers that are exhausted and the vapors condensed for re-use.

I find that by adding from three to ten per cent. of a saturated solution of sulfur, dissolved in a suitable solvent, to the cellulose or celluloid solution, the product will be rendered soft and pliable, the degree of pliability decreasing by increasing the percentage of the sulfur solution above three per cent. When using celluloid as a starting material it is preferable to either wholly or partially de-camphorate it by treating it with a solvent of camphor, gasolene being well suited for the purpose.

The sulfur cellulose compound when mixed with a filler, as fine particles of cork, asbestos, cotton fiber, mineral wool, or the like, makes excellent stoppers for bottles; it is also an excellent coating for cork stoppers, being acid-proof, odorless and tasteless, and imparts neither odor nor taste to any food or beverage. When formed into sealing disks or fruit jar rings, it is an excellent substitute for the rubber now used. It does not oxidize or rot, as do rubber rings.

I claim—

1. The process, which comprises adding to a solution of cellulose or pyroxylin, a solution of sulfur, and evaporating to dryness at normal temperature.

2. The process, which comprises dissolving cellulose or pyroxylin in acetone and adding thereto a solution of sulfur and evaporating to dryness at normal temperature.

3. The process, which comprises dissolving cellulose or pyroxylin in a suitable solvent and adding thereto a small percentage of a solution of sulfur dissolved in chloroform and evaporating to dryness at normal temperature.

4. The process, which comprises dissolving cellulose or pyroxylin in acetone and adding thereto between three and ten per cent. of a solution of sulfur dissolved in chloroform and evaporating to dryness at normal temperature.

5. The process, which comprises dissolving cellulose or pyroxylin in acetone and adding thereto sulfur dissolved in chloroform and evaporating to dryness at normal temperature.

6. The process, which comprises adding to a solution of cellulose or pyroxylin, a solution of sulfur and a filler, and evaporating to dryness at normal temperature.

7. The process which comprises dissolving cellulose or pyroxylin in acetone and adding thereto a solution of sulfur and a filler and evaporating to dryness at normal temperature.

8. The process, which comprises dissolving cellulose or pyroxylin in a suitable solvent and adding thereto a small percentage of a solution of sulfur dissolved in chloroform, and a filler and evaporating to dryness at normal temperature.

9. The process, which comprises dissolving cellulose or pyroxylin in acetone and adding thereto sulfur dissolved in chloroform and a filler and evaporating to dryness at normal temperature.

10. The process, which comprises dissolving cellulose or pyroxylin in acetone and adding thereto between three and ten per cent. of a solution of sulfur dissolved in chloroform and a filler and evaporating to dryness at normal temperature.

11. The process, which comprises adding to a solution of cellulose or pyroxylin, a solution of sulfur, and asbestos, and evaporating to dryness at normal temperature.

12. The process, which comprises dissolving cellulose or pyroxylin in a suitable solvent, and adding thereto a small percentage of a solution of sulfur dissolved in chloroform and asbestos and evaporating to dryness at normal temperature.

13. The process, which comprises dissolving cellulose or pyroxylin in acetone, and adding thereto a solution of sulfur, and asbestos and evaporating to dryness at normal temperature.

14. The process, which comprises dissolving cellulose or pyroxylin in acetone, and adding thereto sulfur dissolved in chloroform, and asbestos and evaporating to dryness at normal temperature.

15. The process which comprises dissolving cellulose or pyroxylin in acetone, and adding thereto between three and ten per cent. of a solution of sulfur, dissolved in chloroform, and asbestos and evaporating to dryness at normal temperature.

In testimony that I claim the foregoing as my invention, I have signed my name in presence of two subscribing witnesses.

PAUL H. A. LEDER.

Witnesses:
LOUIS C. ALBERS,
CARL W. HEFFENS.